UNITED STATES PATENT OFFICE.

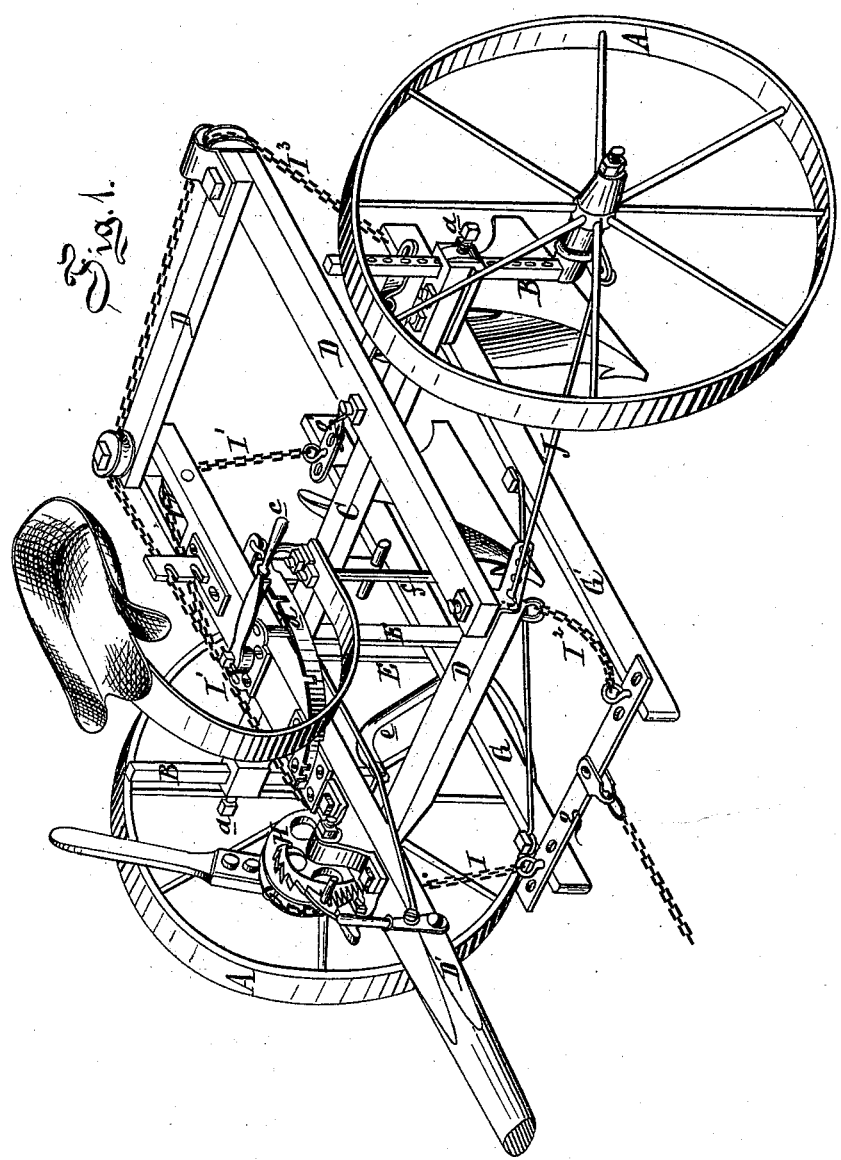

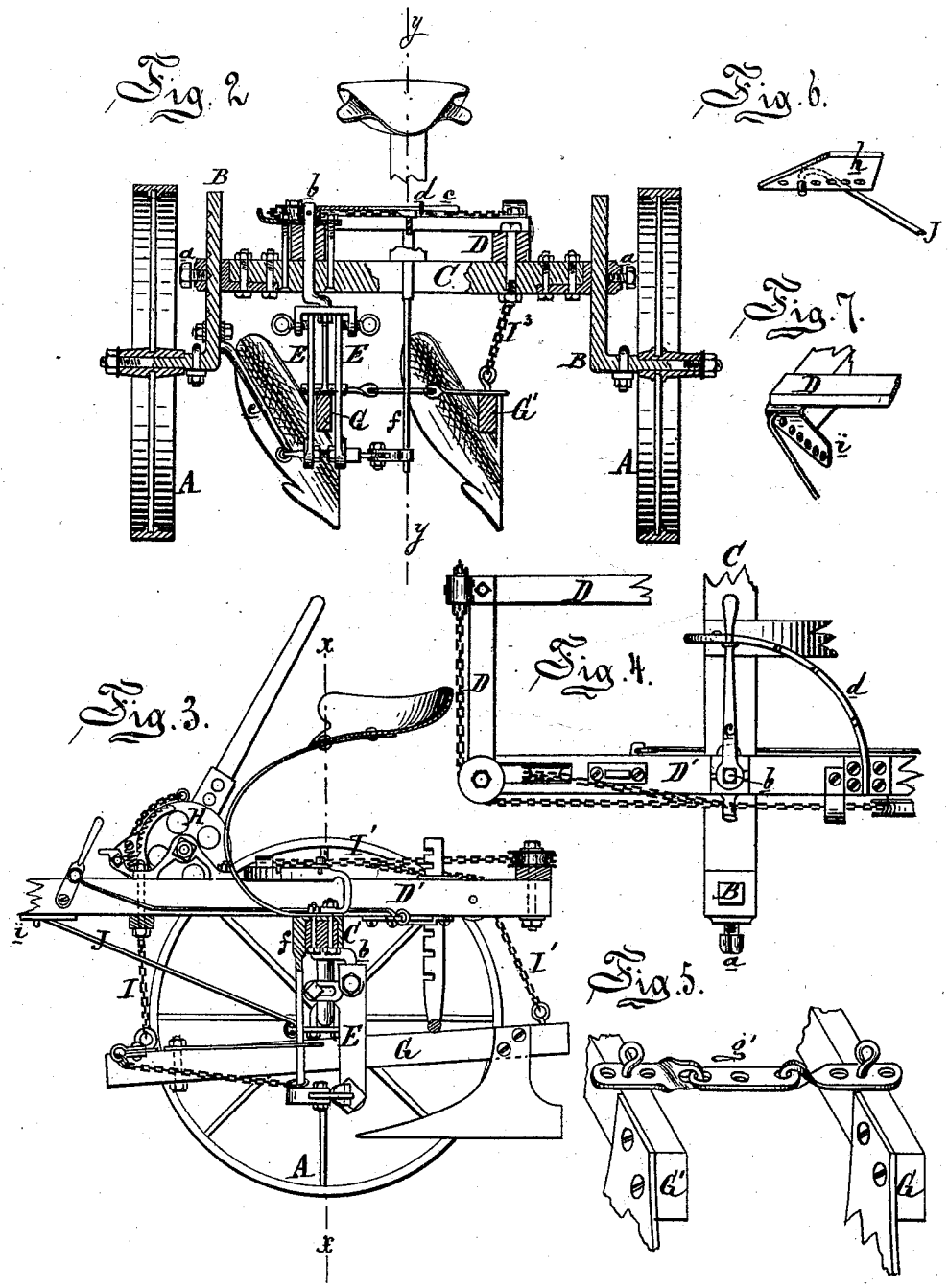

JOHN FAY, OF WAYNE, MICHIGAN.

IMPROVEMENT IN SULKY-PLOWS.

Specification forming part of Letters Patent No. 176,945, dated May 2, 1876; application filed January 28, 1876.

*To all whom it may concern:*

Be it known that I, JOHN FAY, of Wayne, in the county of Wayne and State of Michigan, have invented an Improvement in Sulky-Plows, of which the following is a specification:

My invention relates to certain improvements in Sulky-Plows, and is more particularly designed as an improvement upon the implement for which Letters Patent No. 161,770 were issued to me April 6, 1875. The object I have in view is to construct a gang or double sulky plow in such a manner that both plows can be simultaneously raised and lowered by the mechanism described and shown in said Letters Patent; that the plows can be adjusted to turn furrows of various widths and depths, and to so construct the axles and axle-beam as that the latter can be adjusted so that both wheels can be of the same diameter and yet have one of them run in the furrow while the plows will run level.

Figure 1, Sheet 1, is a perspective view. Figure 2, Sheet 2, is a transverse vertical section at $x\ x$ in Fig. 3, which is a longitudinal vertical section at $y\ y$. Fig. 4 is a plan of a portion of the main frame, showing the crank for shifting the top of the standard-guide. Fig. 5 is a perspective view of the adjustable links which connect the rear ends of the plow-beams. Fig. 6 shows the plate on the tongue or pole, into which hooks the "off" draft-brace. Fig. 7 shows the corresponding plate on the frame, which receives the "near" draft-brace.

In the drawing, A A represent two traction-wheels of equal diameter, each mounted on the arm of an axle, B, the inner end of which is turned vertically to a right angle with the arm, passing through a slot in the end of an axle-beam, $c$, either end of which may be raised or lowered, and secured after adjustment by a set-screw, $a$, Figs. 2 and 4. The beam $c$ can thus be kept in a horizontal or level position while one of the wheels runs in a furrow. D is a frame mounted on the beam C, of which frame the pole or tongue D' forms one of the sides. E is a pair of guide-bars that are adjustable to any width of plow-beam, as described in the said Letters Patent; instead, however, of suspending the guides as therein described, the yoke at the top is hung on the wrist of a horizontal crank turned at the lower end of a shaft, $b$, vertically journaled through the axle-beam, which shaft is fitted with a lever, $c$, at the top, by which it may be turned so as to incline the guide-bars from a vertical position when desired or necessary. The lever $c$ is locked in any position by a notched quadrant, $d$. The lower end of the guides is supported in position by a brace, $e$, at one side, extending to the adjacent axle, to which it is secured by a clip; at the other side it is connected by a link with a rigid pendent rod, $f$. G is the beam of a plow, playing in the pendent guides F. H is the ratchet-pulley and its hand-lever, journaled on a stud at the side of a plate bolted on the pole, as described in said Letters Patent, and from which the front end of the beam is suspended by a chain, I, and the rear end is suspended by a chain, $I^1$, running over guide-pulleys, so that the beam can be raised and lowered, as described in said Letters Patent. G' is the beam of a plow secured to the other, and parallel therewith, by a draft-girt, $g$, at their front ends, and to the middle of which the whiffletrees are attached by a chain. Each end of the girt $g$ has several holes through it, through which the eyebolt passes into the beam, whereby the said beams may be adjusted to or from each other so as to vary the widths between furrows. The front end of the beam G' is suspended from the corner of the frame above by a chain, $I^2$, to check its downward movement when plowing, or to loop it up when raised, but the beam will raise at the front end when the other beam is raised by the chain I and pulley H. The rear end of the beam G' is raised and lowered with the other by a chain, $I^3$, connected with the chain $I^1$, and running over pulleys at the rear corners of the frames. The rear ends of both beams are connected by a flexible girt, $g'$, composed of three bars, with an eye forged in each end, the inner ends or eyes of the outer pieces being twisted half around before forging in the eye of the middle section, so that the plows may yield to inequalities of the ground independently of each other. The outer plates are perforated with several holes, so that the beams may be adjusted parallel with each other for various widths of furrow by inserting the eyebolt of the suspension-chains through the proper holes. A seat for the driver is mounted on the axle-beam by a C-spring.

The axles are kept in their proper position relative to the frame by a brace-rod, J, hooked into a clip on the horizontal arm of each axle; the front end of one brace is hooked into a plate, h, bolted to the under side of the pole, and the other brace is in like manner hooked into a plate, i, at the front near corner of the frame; these plates are each provided with a number of holes, as seen in Figs. 6 and 7, so that the braces may be hooked into them as the axle-beam and frame are raised or lowered in plane.

What I claim as my invention is—

1. In a sulky-plow, the combination with the frame D and beam C of the axles B, having arms adjustable in either end of the said beam, the brace-rods J J, and the plates $h\ i$, substantially as described and shown.

2. The combination of the guide E, laterally adjustable at the upper end, with the cranked shaft $b$ and lever $c$, substantially as described and shown.

3. The combination with the frame D and beam C of the vetically adjustable axles B, the gang of plows G' G', the lever H, and the chains I $I^1$ $I^2$ $I^3$, all substantially as described and shown.

JOHN FAY.

Witnesses:
PETER GIBBONS,
WILLIAM VOORHEIS.